(12) United States Patent
Steffey et al.

(10) Patent No.: US 8,724,119 B2
(45) Date of Patent: May 13, 2014

(54) METHOD FOR USING A HANDHELD APPLIANCE TO SELECT, LOCK ONTO, AND TRACK A RETROREFLECTOR WITH A LASER TRACKER

(71) Applicant: FARO Technologies, Inc., Lake Mary, FL (US)

(72) Inventors: Kenneth Steffey, Longwood, FL (US); Gregory D. Pease, Elkton, MD (US); Robert E. Bridges, Kennett Square, PA (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/851,221

(22) Filed: Mar. 27, 2013

(65) Prior Publication Data

US 2013/0229512 A1 Sep. 5, 2013

Related U.S. Application Data

(63) Continuation-in-part of application No. 13/340,730, filed on Dec. 30, 2011, now Pat. No. 8,537,371, which is a continuation-in-part of application No. 13/090,889, filed on Apr. 20, 2011, now Pat. No. 8,422,034.

(60) Provisional application No. 61/702,864, filed on Sep. 19, 2012, provisional application No. 61/326,294, filed on Apr. 21, 2010.

(51) Int. Cl.
*G01B 11/14* (2006.01)

(52) U.S. Cl.
USPC .......................................................... 356/614

(58) Field of Classification Search
USPC .......................................................... 356/614
See application file for complete search history.

(56) References Cited

U.S. PATENT DOCUMENTS

| 4,413,907 A | 11/1983 | Lane |
| 4,560,270 A | 12/1985 | Wiklund et al. |

(Continued)

FOREIGN PATENT DOCUMENTS

| CA | 2811444 | 3/2012 |
| EP | 0797076 A2 | 9/1997 |

(Continued)

OTHER PUBLICATIONS

Automated Precision, Inc., Product Specifications, Radian, Featuring INNOVO Technology, info@apisensor.com, Copyright 2011.

(Continued)

*Primary Examiner* — Roy M Punnoose
(74) *Attorney, Agent, or Firm* — Cantor Colburn LLP

(57) ABSTRACT

A method for locking onto and tracking a selected retroreflector target with a laser tracker includes steps of: actuating by the operator the handheld appliance and sending a wireless signal; responding to the wireless message by repetitively carrying out steps in the following loop and exiting the loop when an exit condition is met: reflecting part of the cone of light by the at least one retroreflector target and capturing an array image on the photosensitive array; determining which retroreflector target meets the retroreflector target criterion; determining whether the position detector is receiving the reflected beam; establishing that the exit condition is met when the position detector receives the reflected beam and the reflected beam comes from the selected retroreflector target; and steering the first light beam toward the selected retroreflector target.

10 Claims, 12 Drawing Sheets

(56) References Cited

U.S. PATENT DOCUMENTS

| | | |
|---|---|---|
| 4,714,339 A | 12/1987 | Lau et al. |
| 4,731,879 A | 3/1988 | Sepp et al. |
| 4,777,660 A | 10/1988 | Gould et al. |
| 4,790,651 A | 12/1988 | Brown et al. |
| 4,983,021 A | 1/1991 | Fergason |
| 5,051,934 A | 9/1991 | Wiklund |
| 5,121,242 A | 6/1992 | Kennedy |
| 5,137,354 A | 8/1992 | deVos et al. |
| 5,138,154 A | 8/1992 | Hotelling |
| 5,267,014 A | 11/1993 | Prenninger |
| 5,313,409 A | 5/1994 | Wiklund et al. |
| 5,347,306 A | 9/1994 | Nitta |
| 5,440,326 A | 8/1995 | Quinn |
| 5,532,816 A | 7/1996 | Spann et al. |
| 5,594,169 A | 1/1997 | Field et al. |
| D378,751 S | 4/1997 | Smith |
| 5,698,784 A | 12/1997 | Hotelling et al. |
| 5,724,264 A | 3/1998 | Rosenberg et al. |
| 5,767,952 A | 6/1998 | Ohtomo et al. |
| 5,825,350 A | 10/1998 | Case, Jr. et al. |
| 5,828,057 A | 10/1998 | Hertzman et al. |
| 5,898,421 A | 4/1999 | Quinn |
| 5,957,559 A | 9/1999 | Rueb et al. |
| 5,973,788 A | 10/1999 | Pettersen et al. |
| 6,023,326 A | 2/2000 | Katayama et al. |
| 6,034,722 A | 3/2000 | Viney et al. |
| 6,036,319 A | 3/2000 | Rueb et al. |
| 6,085,155 A | 7/2000 | Hayase et al. |
| 6,111,563 A | 8/2000 | Hines |
| 6,133,998 A | 10/2000 | Monz et al. |
| 6,166,809 A | 12/2000 | Pettersen et al. |
| 6,171,018 B1 | 1/2001 | Ohtomo et al. |
| 6,222,465 B1 | 4/2001 | Kumar et al. |
| 6,262,801 B1 | 7/2001 | Shibuya et al. |
| 6,295,174 B1 | 9/2001 | Ishinabe et al. |
| 6,344,846 B1 | 2/2002 | Hines |
| 6,347,290 B1 | 2/2002 | Bartlett |
| 6,353,764 B1 | 3/2002 | Imagawa et al. |
| 6,369,794 B1 | 4/2002 | Sakurai et al. |
| 6,433,866 B1 | 8/2002 | Nichols |
| 6,445,446 B1 | 9/2002 | Kumagai et al. |
| 6,462,810 B1 | 10/2002 | Muraoka et al. |
| 6,559,931 B2 | 5/2003 | Kawamura et al. |
| 6,567,101 B1 | 5/2003 | Thomas |
| 6,573,883 B1 | 6/2003 | Bartlett |
| 6,573,981 B2 | 6/2003 | Kumagai et al. |
| 6,587,244 B1 | 7/2003 | Ishinabe et al. |
| 6,624,916 B1 | 9/2003 | Green et al. |
| 6,646,732 B2 * | 11/2003 | Ohtomo et al. ............ 356/141.5 |
| 6,667,798 B1 | 12/2003 | Markendorf et al. |
| 6,668,466 B1 | 12/2003 | Bieg et al. |
| 6,681,031 B2 | 1/2004 | Cohen et al. |
| 6,802,133 B2 | 10/2004 | Jordil et al. |
| 6,847,436 B2 | 1/2005 | Bridges |
| 6,935,036 B2 | 8/2005 | Raab et al. |
| 6,957,493 B2 | 10/2005 | Kumagai et al. |
| 6,964,113 B2 | 11/2005 | Bridges et al. |
| 6,965,843 B2 | 11/2005 | Raab et al. |
| 6,980,881 B2 | 12/2005 | Greenwood et al. |
| 6,996,912 B2 | 2/2006 | Raab et al. |
| 7,022,971 B2 | 4/2006 | Ura et al. |
| 7,055,253 B2 | 6/2006 | Kaneko |
| 7,072,032 B2 | 7/2006 | Kumagai et al. |
| 7,129,927 B2 | 10/2006 | Mattsson |
| 7,130,035 B2 | 10/2006 | Ohtomo et al. |
| 7,168,174 B2 | 1/2007 | Piekutowski |
| 7,193,695 B2 | 3/2007 | Sugiura |
| 7,222,021 B2 | 5/2007 | Ootomo et al. |
| 7,230,689 B2 | 6/2007 | Lau |
| 7,233,316 B2 | 6/2007 | Smith et al. |
| 7,248,374 B2 | 7/2007 | Bridges |
| 7,274,802 B2 | 9/2007 | Kumagai et al. |
| 7,285,793 B2 | 10/2007 | Husted |
| 7,304,729 B2 | 12/2007 | Yasutomi et al. |
| 7,307,710 B2 | 12/2007 | Gatsios et al. |
| 7,312,862 B2 | 12/2007 | Zumbrunn et al. |
| 7,321,420 B2 | 1/2008 | Yasutomi et al. |
| 7,327,446 B2 | 2/2008 | Cramer et al. |
| 7,345,748 B2 | 3/2008 | Sugiura et al. |
| 7,352,446 B2 | 4/2008 | Bridges et al. |
| 7,388,654 B2 | 6/2008 | Raab et al. |
| 7,388,658 B2 | 6/2008 | Glimm |
| 7,401,783 B2 | 7/2008 | Pryor |
| 7,423,742 B2 | 9/2008 | Gatsios et al. |
| 7,446,863 B2 | 11/2008 | Nishita et al. |
| 7,466,401 B2 | 12/2008 | Cramer et al. |
| 7,474,388 B2 | 1/2009 | Ohtomo et al. |
| 7,503,123 B2 | 3/2009 | Matsuo et al. |
| 7,541,965 B2 | 6/2009 | Ouchi et al. |
| 7,552,539 B2 | 6/2009 | Piekutowski |
| 7,555,766 B2 | 6/2009 | Kondo et al. |
| 7,562,459 B2 | 7/2009 | Fourquin et al. |
| 7,564,538 B2 | 7/2009 | Sakimura et al. |
| 7,583,375 B2 | 9/2009 | Cramer et al. |
| 7,634,381 B2 | 12/2009 | Westermark et al. |
| 7,705,830 B2 | 4/2010 | Westerman et al. |
| 7,728,963 B2 | 6/2010 | Kirschner |
| 7,765,084 B2 | 7/2010 | Westermark et al. |
| 7,800,758 B1 | 9/2010 | Bridges et al. |
| 7,804,602 B2 | 9/2010 | Raab |
| 7,903,237 B1 | 3/2011 | Li |
| 8,237,934 B1 | 8/2012 | Cooke et al. |
| 8,320,708 B2 | 11/2012 | Kurzweil et al. |
| 8,379,224 B1 | 2/2013 | Piasse et al. |
| 8,472,029 B2 * | 6/2013 | Bridges et al. ............ 356/498 |
| 2002/0148133 A1 | 10/2002 | Bridges et al. |
| 2003/0014212 A1 | 1/2003 | Ralston et al. |
| 2003/0206285 A1 | 11/2003 | Lau |
| 2005/0185182 A1 | 8/2005 | Raab et al. |
| 2005/0197145 A1 | 9/2005 | Chae et al. |
| 2005/0254043 A1 | 11/2005 | Chiba |
| 2006/0009929 A1 | 1/2006 | Boyette et al. |
| 2006/0055662 A1 | 3/2006 | Rimas-Ribikauskas et al. |
| 2006/0055685 A1 | 3/2006 | Rimas-Ribikauskas et al. |
| 2006/0146009 A1 | 7/2006 | Syrbe et al. |
| 2006/0161379 A1 | 7/2006 | Ellenby et al. |
| 2006/0164384 A1 | 7/2006 | Smith et al. |
| 2006/0164385 A1 | 7/2006 | Smith et al. |
| 2006/0164386 A1 | 7/2006 | Smith et al. |
| 2006/0262001 A1 | 11/2006 | Ouchi et al. |
| 2007/0016386 A1 | 1/2007 | Husted |
| 2007/0019212 A1 | 1/2007 | Gatsios et al. |
| 2007/0236452 A1 | 10/2007 | Venkatesh et al. |
| 2008/0122786 A1 | 5/2008 | Pryor et al. |
| 2008/0229592 A1 | 9/2008 | Hinderling et al. |
| 2008/0309949 A1 | 12/2008 | Rueb |
| 2009/0033621 A1 | 2/2009 | Quinn et al. |
| 2009/0171618 A1 | 7/2009 | Kumagai et al. |
| 2009/0239581 A1 | 9/2009 | Lee |
| 2009/0240372 A1 | 9/2009 | Bordyn et al. |
| 2009/0240461 A1 | 9/2009 | Makino et al. |
| 2009/0240462 A1 | 9/2009 | Lee |
| 2010/0091112 A1 | 4/2010 | Veeser et al. |
| 2010/0128259 A1 | 5/2010 | Bridges et al. |
| 2010/0149518 A1 | 6/2010 | Nordenfelt et al. |
| 2010/0234094 A1 | 9/2010 | Gagner et al. |
| 2010/0235786 A1 | 9/2010 | Maizels et al. |
| 2010/0265316 A1 | 10/2010 | Sali et al. |
| 2010/0284082 A1 | 11/2010 | Shpunt et al. |
| 2011/0007154 A1 | 1/2011 | Vogel et al. |
| 2011/0023578 A1 | 2/2011 | Grasser |
| 2011/0025827 A1 | 2/2011 | Shpunt et al. |
| 2011/0035952 A1 | 2/2011 | Roithmeier |
| 2011/0043620 A1 | 2/2011 | Svanholm et al. |
| 2011/0052006 A1 | 3/2011 | Gurman et al. |
| 2011/0069322 A1 | 3/2011 | Hoffer, Jr. |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0112786 A1 | 5/2011 | Desforges et al. |
| 2011/0181872 A1 | 7/2011 | Dold et al. |
| 2011/0260033 A1 | 10/2011 | Steffensen et al. |
| 2012/0050255 A1 | 3/2012 | Thomas et al. |

(56) References Cited

U.S. PATENT DOCUMENTS

| | | | |
|---|---|---|---|
| 2012/0120391 | A1 | 5/2012 | Dold et al. |
| 2012/0120415 | A1 | 5/2012 | Steffensen et al. |
| 2012/0327390 | A1* | 12/2012 | Bridges et al. .......... 356/3 |

FOREIGN PATENT DOCUMENTS

| | | |
|---|---|---|
| EP | 0919831 A2 | 6/1999 |
| EP | 0957336 A2 | 11/1999 |
| JP | 2004108939 | 4/2008 |
| WO | 9534849 A1 | 12/1995 |
| WO | 0223121 A1 | 3/2002 |
| WO | 0237466 A1 | 5/2002 |
| WO | 03062744 A1 | 7/2003 |
| WO | 03073121 A1 | 9/2003 |
| WO | 2007079601 A1 | 7/2007 |
| WO | 2010100043 A1 | 9/2010 |
| WO | 2010148526 A1 | 12/2010 |
| WO | 2011057130 A2 | 5/2011 |

OTHER PUBLICATIONS

FARO Technical Institute, Basic Measurement Training Workbook, Version 1.0, FARO Laser Tracker, Jan. 2008, Students Book, FAO CAM2 Measure.

Kollorz, et al., "Gesture recognition with a time-of-flight camera", International Journal of Intelligent Systems Technologies and Applications, vol. 5, No. 3/4, pp. 334-343, [Retreived Aug. 11, 2011; http://www5.informatik.uni-erlangen.de/Forschung/Publikationen/2008/Kollorz08-GRW.pdf] (2008).

International Search Report of the International Application No. PCT/US2011/033360 mailed Feb. 29, 2012.

International Search Report of the International Searching Authority for Application No. PCT/US2012/070283; Date of Mailing Mar. 27, 2013.

Hecht, Jeff, Photonic Frontiers: Gesture Recognition: Lasers Bring Gesture Recognition to the Home, Laser Focus World, pp. 1-5, [Retreived On-Line Mar. 3, 2011], http://www.optoiq.com/optoiq-2/en-us/index/photonics-technologies-applications/lfw-display/lfw-articles-toolstemplate.articles.optoiq2.photonics-technologies.technology-products.imaging-_detectors.2011.01.lasers-bringgesture-recognition-to-the-home.html.

New River Kinematics, SA Arm—The Ultimate Measurement Software for Arms, Software Release! SA Sep. 30, 2010, [On-line], http://www.kinematics.com/news/software-release-sa20100930.html (1 of 14), [Retreived Apr. 13, 2011 11:40:47 AM].

Turk, et al., "Perceptual Interfaces", UCSB Technical Report 2003-33, pp. 1-43 [Retreived Aug. 11, 2011, http://www.cs.ucsb.edu/research/tech_reports/reports/2003-33.pdf] (2003).

Li, et al., "Real Time Hand Gesture Recognition using a Range Camera", Australasian Conference on Robotics and Automation (ACRA), [Retreived Aug. 10, 2011, http://www.araa.asn.au/acra/acra2009/papers/pap128s1.pdf] pp. 1-7 (2009).

Cao, et al."VisionWand: Interaction Techniques for Large Displays using a Passive Wand Tracked in 3D", Proceedings of the 16th Annual ACM Symposium on User Interface Software and Technology, UIST, vol. 5, issue 2, pp. 173-182, (Jan. 2003).

Written Opinion of the International Searching Authority for International Application No. PCT/US2011/033360 mailed Feb. 29, 2011.

Written Opinion of the International Searching Authority for Application No. PCT/US2012/070283; Date of Mailing Mar. 27, 2013.

International Search Report of the International Searching Authority for Application No. PCT/US2013/059592; Date of Mailing Dec. 10, 2013.

Rahman, et al., "Spatial-Geometric Approach to Physical Mobile Interaction Based on Accelerometer and IR Sensory Data Fusion", ACM Transactions on Multimedia Computing, Communications and Applications, vol. 6, No. 4, Article 28, Publication date: Nov. 2010.

Written Opinion of the International Searching Authority for Application No. PCT/US2013/059592; Date of Mailing Dec. 10, 2013.

International Search Report of the International Searching Authority for Application No. PCT/US2012/028984; Date of Mailing Jul. 19, 2012.

International Search Report of the International Searching Authority for Application No. PCT/US2012/027083; Date of Mailing Jun. 29, 2012.

Leica Geosystems Metrology, "Leica Absolute Tracker AT401, White Paper," Hexagon AB; 2010.

Leica Geosystems AG ED—"Leica Laser Tracker System", Internet Citation, Jun. 28, 2012, XP002678836, Retrieved from the Internet: URL:http://www.a-solution.com.au/pages/downloads/LTD500_Brochure_EN.pdf.

Maekynen, A. J. et al., Tracking Laser Radar for 3-D Shape Measurements of Large Industrial Objects Based on Time-of-Flight Laser Rangefinding and Position-Sensitive Detection Techniques, IEEE Transactions on Instrumentation and Measurement, vol. 43, No. 1, Feb. 1, 1994, pp. 40-48, XP000460026, ISSN: 0018-9456, DOI 10.1109/19.286353, the whole document.

Leica Geosystems: "TPS1100 Professional Series", 1999, Retrieved from the Internet: URL:http://www.estig.ipbeja.pt/~legvm/top_civil/TPS1100%20-%20A%20New%20Generation%20of%20Total%20Stations.pdf, [Retrieved on Jul. 2012] the whole document.

Written Opinion of the International Searching Authority for Application No. PCT/US2012/028984; Date of Mailing Jul. 19, 2012.

Written Opinion of the International Searching Authority for International Application PCT/US2012/027083; Date of Mailing Jun. 29, 2012.

* cited by examiner

METHOD FOR USING A HANDHELD APPLIANCE TO SELECT, LOCK ONTO, AND TRACK A RETROREFLECTOR WITH A LASER TRACKER

CROSS-REFERENCE TO RELATED APPLICATIONS

This application is a Non-Provisional of U.S. Provisional Application Ser. No. 61/702,864, filed Sep. 19, 2012. This application is also a Continuation-In-Part of U.S. patent application Ser. No. 13/340,730, filed Dec. 30, 2011; U.S. patent application Ser. No. 13/340,730 is a Continuation-In-Part of U.S. patent application Ser. No. 13/090,889, filed on Apr. 20, 2011, which claims priority to U.S. Provisional Patent Application No. 61/326,294, filed Apr. 21, 2010, the entire contents of each which are incorporated herein by reference.

BACKGROUND

The following background art may be regarded as useful for the understanding of the invention: U.S. Patent Publication No. 2012/120391 A1; CA Patent No. 2,811,444 A1; and, U.S. Patent Publication No. 2012/120415 A1.

The present invention relates to a coordinate measuring device. One set of coordinate measurement devices belongs to a class of instruments that measure the three-dimensional (3D) coordinates of a point by sending a laser beam to the point, where it is intercepted by a retroreflector target. The instrument finds the coordinates of the point by measuring the distance and the two angles to the target. The distance is measured with a distance-measuring device such as an absolute distance meter (ADM) or an interferometer. The angles are measured with an angular transducer such as an angular encoder. A gimbaled beam-steering mechanism within the instrument directs the laser beam to the point of interest. An example of such a device is a laser tracker.

A coordinate measuring device closely related to the laser tracker is the total station. The total station, which is most often used in surveying applications, may be used to measure the coordinates of diffusely scattering or retroreflective targets. Hereinafter, the term laser tracker is used in a broad sense to include total stations.

Ordinarily a laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The apex of the cube corner, which is the common point of intersection of the three mirrors, is located at the center of the sphere. It is common practice to place the spherical surface of the SMR in contact with an object under test and then move the SMR over the surface being measured. Because of this placement of the cube corner within the sphere, the perpendicular distance from the apex of the cube corner to the surface of the object under test remains constant despite rotation of the SMR. Consequently, the 3D coordinates of a surface can be found by having a tracker follow the 3D coordinates of an SMR moved over the surface.

A gimbal mechanism within the laser tracker may be used to direct a laser beam from the tracker to the SMR. Part of the light retroreflected by the SMR enters the laser tracker and passes onto a position detector. The position of the light that hits the position detector is used by a tracker control system to adjust the rotation angles of the mechanical azimuth and zenith axes of the laser tracker to keep the laser beam centered on the SMR. In this way, the tracker is able to follow (track) the SMR.

Angular transducers such as angular encoders attached to the mechanical azimuth and zenith axes of the tracker may be used to determine the azimuth and zenith angles of the laser beam (with respect to the tracker frame of reference). The one distance measurement and two angle measurements obtained by the laser tracker are sufficient to completely specify the three-dimensional location of the SMR or other retroreflector target.

As mentioned previously, two types of distance meters may be found in laser trackers: interferometers and absolute distance meters (ADMs). In the laser tracker, an interferometer (if present) may determine the distance from a starting point to a finishing point by counting the number of increments of known length (usually the half-wavelength of the laser light) that pass as a retroreflector target is moved between the two points. If the beam is broken during the measurement, the number of counts cannot be accurately known, causing the distance information to be lost. By comparison, the ADM in a laser tracker determines the absolute distance to a retroreflector target without regard to beam breaks, which also allows switching between targets. Because of this, the ADM is said to be capable of "point-and-shoot" measurement. Initially, absolute distance meters were only able to measure stationary targets and for this reason were always used together with an interferometer. However, some modern absolute distance meters can make rapid measurements, thereby eliminating the need for an interferometer.

In its tracking mode, the laser tracker will automatically follow movements of the SMR when the SMR is in the capture range of the tracker. If the laser beam is broken, tracking will stop. The beam may be broken by any of several means: (1) an obstruction between the instrument and SMR; (2) rapid movements of the SMR that are too fast for the instrument to follow; or (3) the direction of the SMR being turned beyond the acceptance angle of the SMR. Following a beam break, in some modes of operation the beam by default remains fixed at the point of the beam break or at the last commanded position. It may be necessary for an operator to visually search for the tracking beam and place the SMR in the beam in order to lock the instrument onto the SMR and continue tracking. In another mode of operation, the beam may be automatically directed back to the SMR through the use of a camera system, as discussed hereinbelow.

Some laser trackers include one or more cameras. A camera axis may be coaxial with the measurement beam or offset from the measurement beam by a fixed distance or angle. A camera may be used to provide a wide field of view to locate retroreflectors. A modulated light source placed near the camera optical axis may illuminate retroreflectors, thereby making them easier to identify. In this case, the retroreflectors flash in phase with the illumination, whereas background objects do not. One application for such a camera is to detect multiple retroreflectors in the field of view and measure each in an automated sequence.

Some laser trackers have the ability to measure with six degrees of freedom (DOF), which may include three coordinates, such as x, y, and z, and three rotations, such as pitch, roll, and yaw. Several systems based on laser trackers are available or have been proposed for measuring six degrees of freedom.

As explained hereinabove, tracking of a retroreflector target stops when the beam is broken. In some cases, such a beam break is intentionally created by the operator—for example, to use to beam to provide a marker for the alignment of target stands or instruments. In other cases, a beam break is unintentional or unavoidable—for example, when an operator rotates the retroreflector target too much or passes the retroreflector behind an object in moving from one point to another. In cases where the beam break is unwanted, it is desirable to provide a way to conveniently steer the beam back onto the retroreflector target.

One method known in the art for conveniently steering a beam back onto a retroreflector target is to illuminate the retroreflector target with a cone of light, to view the illuminated retroreflector target with a locator camera placed in close proximity to the light source producing the cone of light, to evaluate the position of the retroreflector image on a photosensitive array contained within the locator camera, and to activate motors of the laser tracker to drive the beam of light from the tracker toward the retroreflector target. This action may be repeated if necessary to lock the light beam from the tracker onto the retroreflector target. The locking of the light beam on the retroreflector target may be recognized by the position detector receiving a relatively large amount of retroreflected light.

In one implementation of this method for steering a beam onto a retroreflector target, the locator camera system automatically finds and locks onto a nearby retroreflector target whenever the tracker loses the beam. However, this method is limited in some respects. In some cases, numerous retroreflector targets may be located within a measurement volume, and the operator may want to direct the tracker beam to a different target than the one automatically selected by the tracker following a beam break. In other cases, the operator may want the tracker beam to remain fixed in direction so that a stand or instrument may be aligned to it.

One way around this difficulty that is known in the art is to use gestures to control the behavior of a laser tracker. In one implementation using gestures, a retroreflector target is followed using one or more locator cameras and associated proximate light sources. In this implementation, the cameras may detect a particular gesture by evaluating the motion of an illuminated retroreflector target or evaluating a pattern in the power of light from the retroreflector targets. A potential disadvantage in the use of gestures is that the operator must remember the correspondence between tracker commands and gestures.

What is needed is a flexible and convenient method for acquiring retroreflector targets. In some cases, it is desirable to recapture a retroreflector target following a beam break. In other cases, it is desirable to direct a tracker beam, either broken or unbroken, to a different retroreflector target.

SUMMARY

A method for locking onto and tracking a selected retroreflector target with a laser tracker, the locking onto and tracking carried out under direction of an operator, the method including steps of: providing at least one retroreflector target; providing the laser tracker, the laser tracker having a structure, a first light source, a distance meter, a first angular transducer, a second angular transducer, a position detector, a camera, a second light source, and a processor, the structure rotatable about a first axis and a second axis; the first light source configured to produce a first light beam that cooperates with the distance meter, the first angular transducer configured to measure a first angle of rotation about the first axis, the second angular transducer configured to measure a second angle of rotation about the second axis, the position detector configured to receive a reflected beam, the reflected beam being the first light beam reflected by a retroreflector target, the camera including a lens system and a photosensitive array, the second light source configured to provide a cone of light, the first light beam and the cone of light being fixed in relation to the structure, the second light source configured to cooperate with the camera, the camera having a field of view, the processor configured to operate the laser tracker. The method also includes the steps of: providing a transceiver coupled to the laser tracker or coupled to a computer in communication with the laser tracker, the transceiver including a receiver and optionally a transmitter; providing a handheld appliance configured to wirelessly communicate with the transceiver; positioning the at least one retroreflector target within the field of view of the camera; actuating by the operator the handheld appliance and sending in response to the actuation a wireless message to the transceiver; determining a retroreflector target criterion; responding to the wireless message by repetitively carrying out steps in a loop including the following steps (a)-(e) and exiting the loop when an exit condition is met: (a) reflecting part of the cone of light by the at least one retroreflector target and capturing an array image on the photosensitive array; (b) determining which retroreflector target meets the retroreflector target criterion, the determining based at least in part on the array image, the retroreflector target that meets the retroreflector target criterion referred to as the selected retroreflector target; (c) measuring a signal level with the position detector and determining, based on the signal level, whether the position detector is receiving the reflected beam; (d) establishing whether the exit condition is met, the exit condition being met if and only if the position detector receives the reflected beam and the reflected beam comes from the selected retroreflector target; (e) activating the first motor and the second motor to steer the first light beam toward the selected retroreflector target; activating the first motor and the second motor to steer the reflected beam so as to keep the reflected beam on the position detector; and measuring to the first retroreflector target a distance with the distance meter, a third angle with the first angular transducer, and a fourth angle with the second angular transducer.

BRIEF DESCRIPTION OF THE DRAWINGS

Referring now to the drawings, wherein like elements are numbered alike in the several FIGURES.

DETAILED DESCRIPTION OF THE PREFERRED EMBODIMENTS

Figure 1:
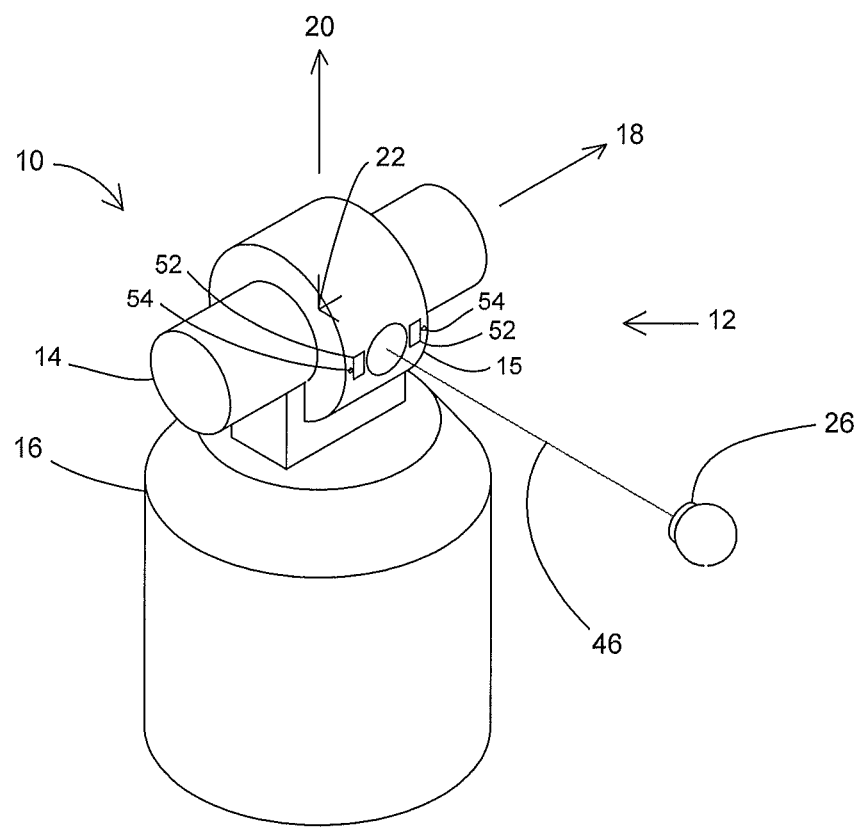
FIG. 1 is a perspective view of a prior art laser tracker.

A prior art laser tracker 10 is illustrated in FIG. 1. An exemplary gimbaled beam-steering mechanism 12 of laser tracker 10 comprises zenith carriage 14 mounted on azimuth base 16 and rotated about azimuth axis 20. Payload 15 is mounted on zenith carriage 14 and rotated about zenith axis 18. Zenith mechanical rotation axis 18 and azimuth mechanical rotation axis 20 intersect orthogonally, internally to tracker 10, at gimbal point 22, which is typically the origin for distance measurements. Laser beam 46 virtually passes through gimbal point 22 and is pointed orthogonal to zenith axis 18. In other words, laser beam 46 is in a plane normal to zenith axis 18. Laser beam 46 is pointed in the desired direction by motors within the tracker (not shown) that rotate payload 15 about zenith axis 18 and azimuth axis 20. Zenith and azimuth angular encoders, internal to the tracker (not shown), are attached to zenith mechanical axis 18 and azimuth mechanical axis 20 and indicate, to high accuracy, the angles of rotation. Laser beam 46 travels to external retroreflector 26 such as the spherically mounted retroreflector (SMR) described above. By measuring the radial distance between gimbal point 22 and retroreflector 26 and the rotation angles about the zenith and azimuth axes 18, 20, the position of retroreflector 26 is found within the spherical coordinate system of the tracker.

Laser beam 46 may comprise one or more laser wavelengths. For the sake of clarity and simplicity, a steering mechanism of the sort shown in FIG. 1 is assumed in the following discussion. However, other types of steering mechanisms are possible. For example, it would be possible to reflect a laser beam off a mirror rotated about the azimuth and zenith axes. The techniques described here are applicable, regardless of the type of steering mechanism.

In exemplary laser tracker 10, cameras 52 and light sources 54 are located on payload 15. Light sources 54 illuminate one or more retroreflector targets 26. Light sources 54 may be LEDs electrically driven to repetitively emit pulsed light. Each camera 52 includes a photosensitive array and a lens placed in front of the photosensitive array. The photosensitive array may be a CMOS or CCD array. The lens may have a relatively wide field of view, say thirty or forty degrees. The purpose of the lens is to form an image on the photosensitive array of objects within the field of view of the lens. Each light source 54 is placed near camera 52 so that light from light source 54 is reflected off each retroreflector target 26 onto camera 52. In this way, retroreflector images are readily distinguished from the background on the photosensitive array as their image spots are brighter than background objects and are pulsed. There may be two cameras 52 and two light sources 54 placed about the line of laser beam 46. By using two cameras in this way, the principle of triangulation can be used to find the three-dimensional coordinates of any SMR within the field of view of the camera. In addition, the three-dimensional coordinates of the SMR can be monitored as the SMR is moved from point to point.

Other arrangements of one or more cameras and light sources are possible. For example, a light source and camera can be coaxial or nearly coaxial with the laser beams emitted by the tracker. In this case, it may be necessary to use optical filtering or similar methods to avoid saturating the photosensitive array of the camera with the laser beam from the tracker. Another possible arrangement is to use a single camera located on the payload or base of the tracker.

Figure 2:
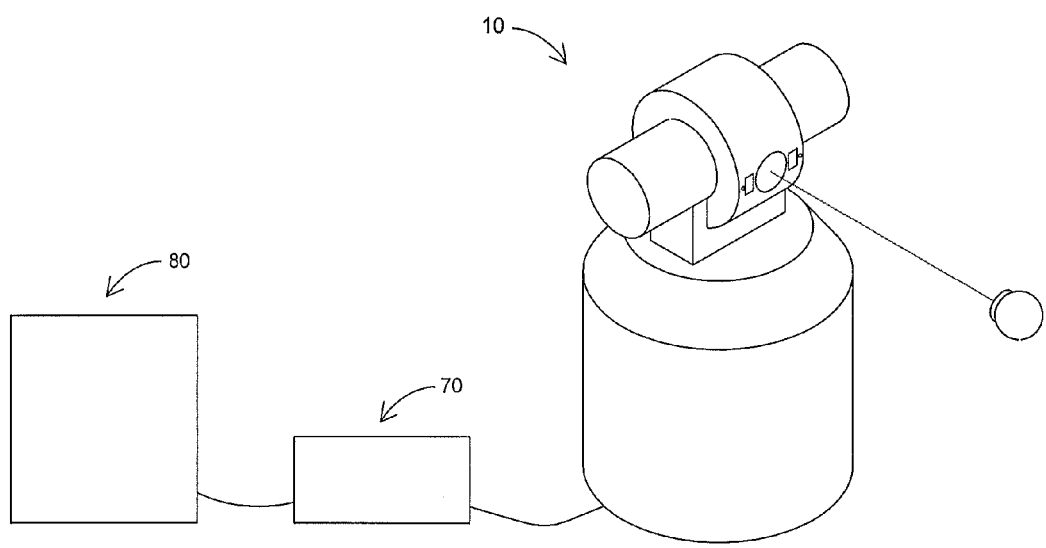
FIG. 2 is a perspective view of a prior art laser tracker system.

As shown in FIG. 2, auxiliary unit 70 is usually a part of prior art laser tracker 10. The purpose of auxiliary unit 70 is to supply electrical power to the laser tracker body and in some cases to also supply computing and clocking capability to the system. It is possible to eliminate auxiliary unit 70 altogether by moving the functionality of auxiliary unit 70 into the tracker body. In most cases, auxiliary unit 70 is attached to general purpose computer 80. Application software loaded onto general purpose computer 80 may provide application capabilities such as reverse engineering. It is also possible to eliminate general purpose computer 80 by building its computing capability directly into laser tracker 10. In this case, a user interface, possibly providing keyboard and mouse functionality is built into laser tracker 10. The connection between auxiliary unit 70 and computer 80 may be wireless or through a cable of electrical wires. Computer 80 may be connected to a network, and auxiliary unit 70 may also be connected to a network. Plural instruments, for example, multiple measurement instruments or actuators, may be connected together, either through computer 80 or auxiliary unit 70.

The laser tracker 10 may be rotated on its side, rotated upside down, or placed in an arbitrary orientation. In these situations, the terms azimuth axis and zenith axis have the same direction relative to the laser tracker as the directions shown in FIG. 1 regardless of the orientation of the laser tracker 10.

In another embodiment, the payload 15 is replaced by a mirror that rotates about the azimuth axis 20 and the zenith axis 18. A laser beam is directed upward and strikes the mirror, from which it launches toward a retroreflector 26.

Figure 3:
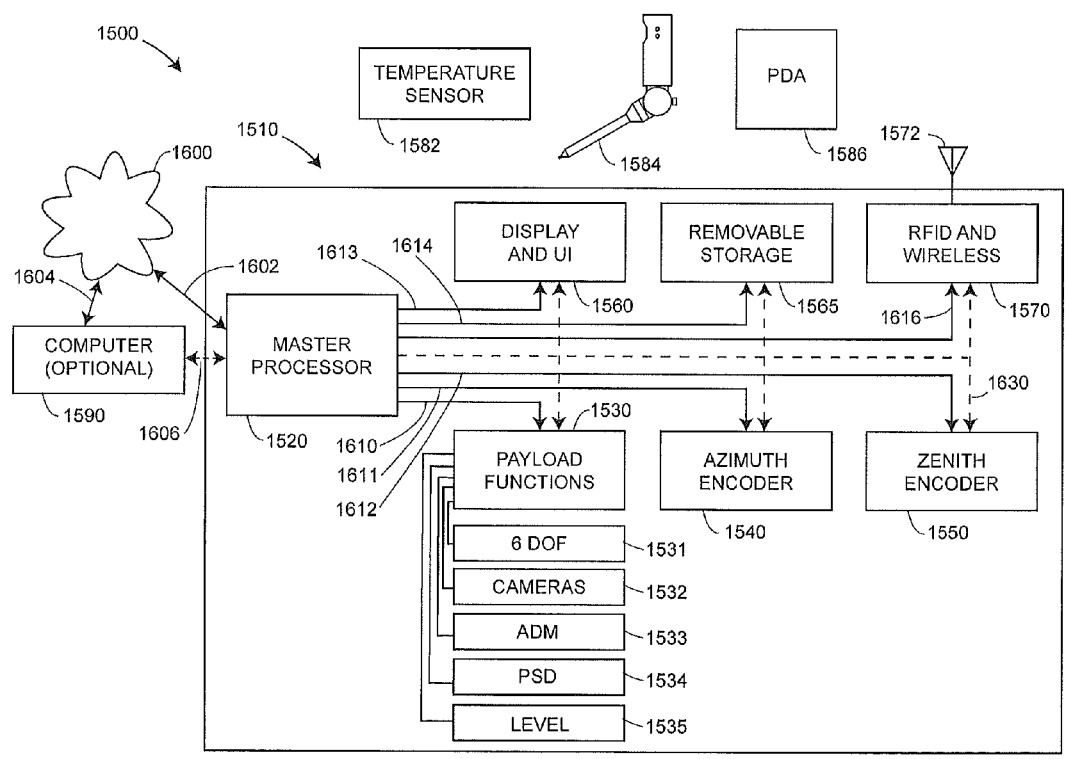
FIG. 3 is a block diagram of electronics of a prior art laser tracker system.

FIG. 3 is a block diagram depicting prior art dimensional measurement electronics processing system 1500 that includes a laser tracker electronics processing system 1510, peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics 1570, and an antenna 1572. The payload functions electronics 1530 may include a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in a payload, while the azimuth encoder electronics is located in the azimuth assembly and the zenith encoder electronics 1550 is located in the zenith assembly.

Many types of peripheral devices are possible, but here three such devices are shown: a temperature sensor 1582, a six-DOF probe 1584, and a personal digital assistant, 1586, which might be a smart phone or a remote control, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The laser tracker electronics processing system 1510 may communicate with an external computer 1590, or it may provide computation, display, and UI functions within the laser tracker. The laser tracker communicates with computer 1590 over communications link 1606, which might be, for example, and Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

A method and apparatus in an embodiment of the present invention is shown in FIGS. 4-7. Laser tracker 10 sends out laser beam 46 as in FIG. 1, but in one instance the beam has been broken and is no longer aligned with the retroreflector target 26. In another instance, the beam is still locked onto a retroreflector target, but the operator wants to lock onto a different retroreflector target. In either case, an operator actuates a handheld appliance 410 (step 705 in FIG. 7), for example, by pressing a button or pushing a soft key appearing on a UI of the handheld appliance 410. The actuation causes transceiver 415 to emit wireless signal 420, which might be an RF, microwave, or infrared signal, for example, that is received by one or more transceivers 65A, 65B, and 65C in the computer 80, auxiliary unit 70, and tracker 65, respectively (step 708 in FIG. 7). In this document, the term transceiver is used to denote any device that contains a transmitter, receiver, or both transmitter and receiver. The auxiliary unit 70 may contain the power supply and optionally the master processor 1520, and hence may be considered part of the laser tracker 65.

Figure 7:
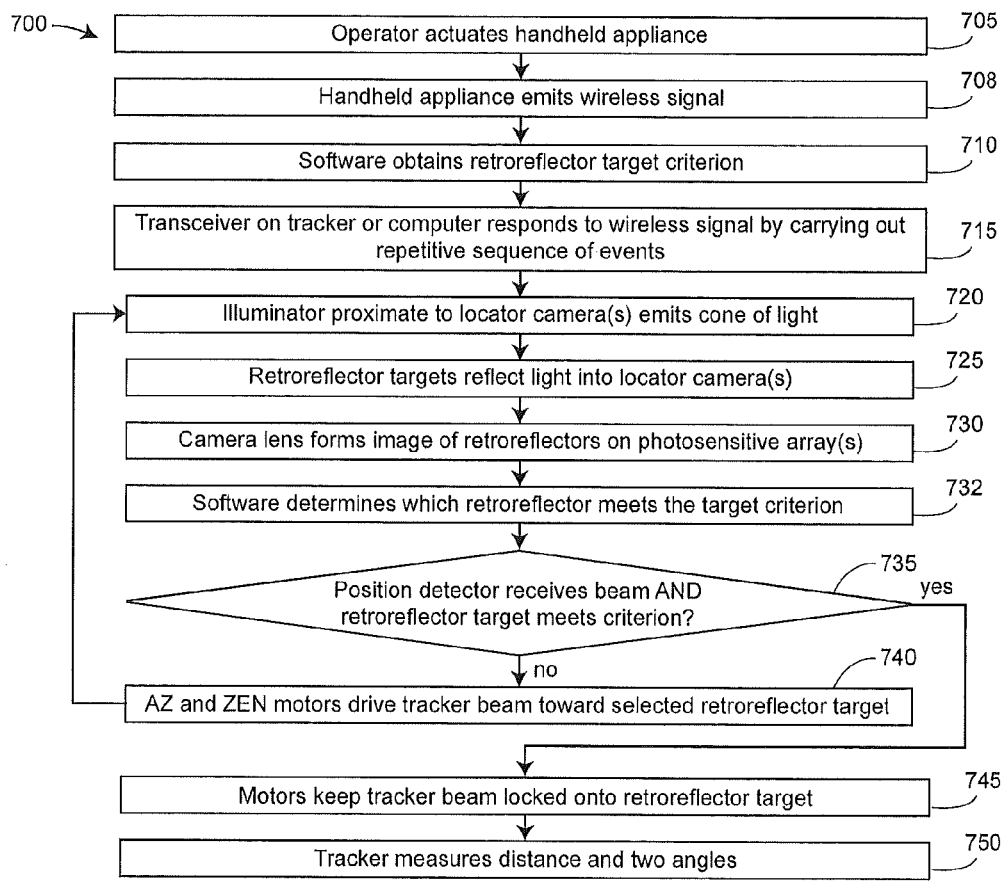
FIG. 7 is a flow chart showing steps in a method for selecting, locking onto, and tracking a retroreflector target according to an embodiment of the present invention.

The reception of the wireless signal by the one or more transceivers 65A, 65B, and 65C causes the software to obtain a retroreflector target criterion (step 710 in FIG. 7). The retroreflector target criterion is a criterion that describes the characteristics of the target that the tracker is to lock onto. The criterion may, for example, be the retroreflector that is closest to the beam of light 46 from the laser tracker. Other examples of retroreflector target criteria are described hereinbelow. The criterion may be chosen by the operator by pressing a soft key on the UI of the handheld apparatus, for example. The criterion may instead be provided by the operator by choosing a default setting ahead of time, for example, in a Properties or Settings menu of software used with the laser tracker.

Figure 4:
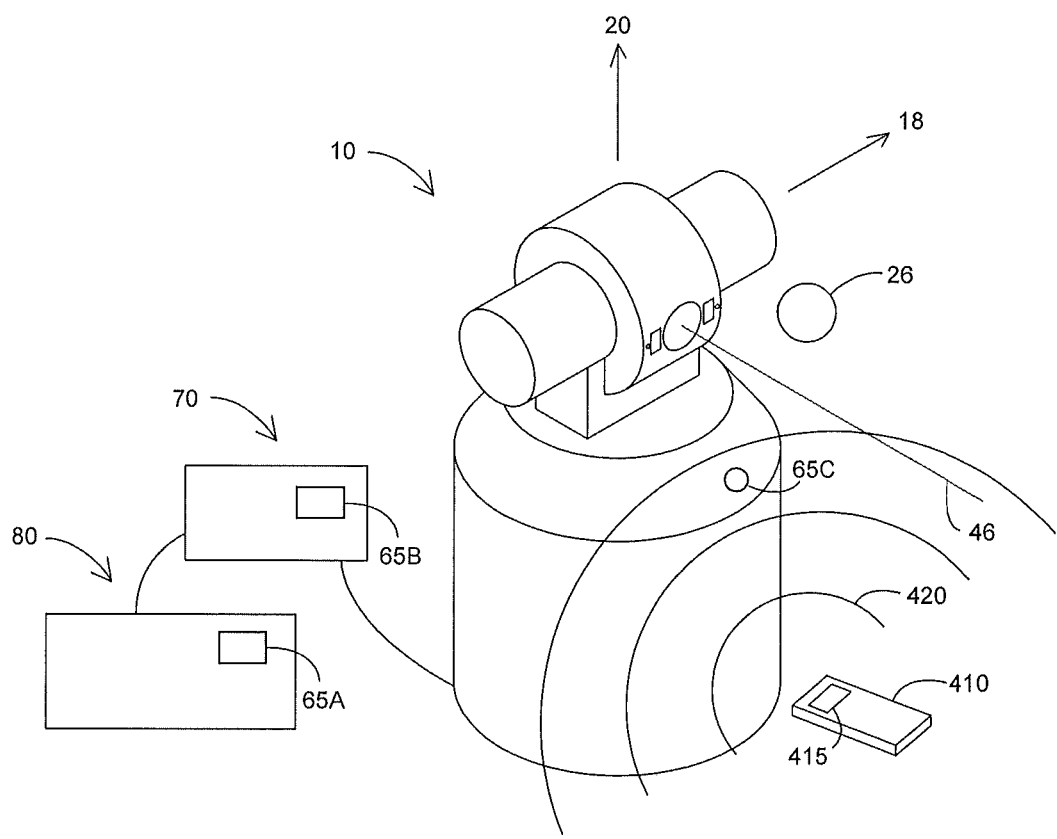
FIG. 4 is a perspective view of a laser tracker used with a wireless appliance according to an embodiment of the present invention.
Figure 5:
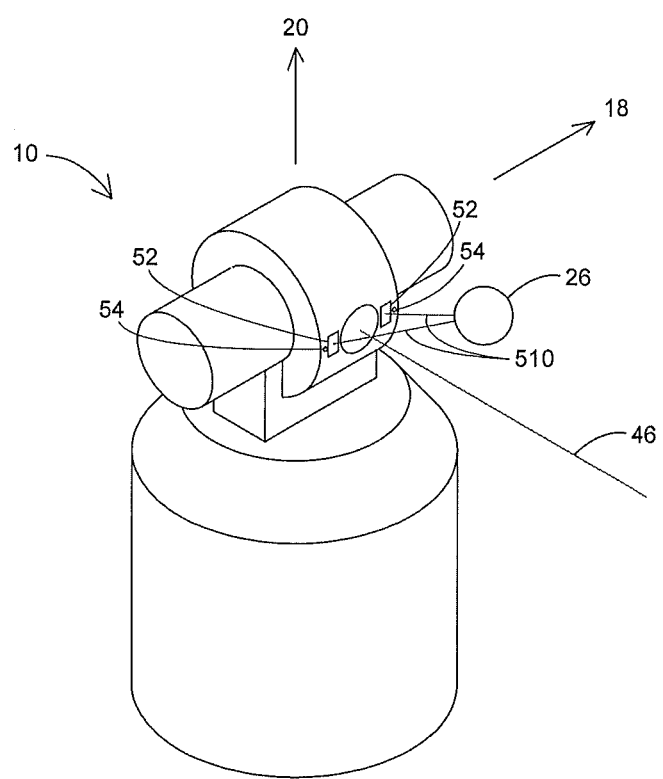
FIG. 5 is a perspective view of a laser tracker obtaining reflected light with locator cameras according to an embodiment of the present invention.
Figure 6:
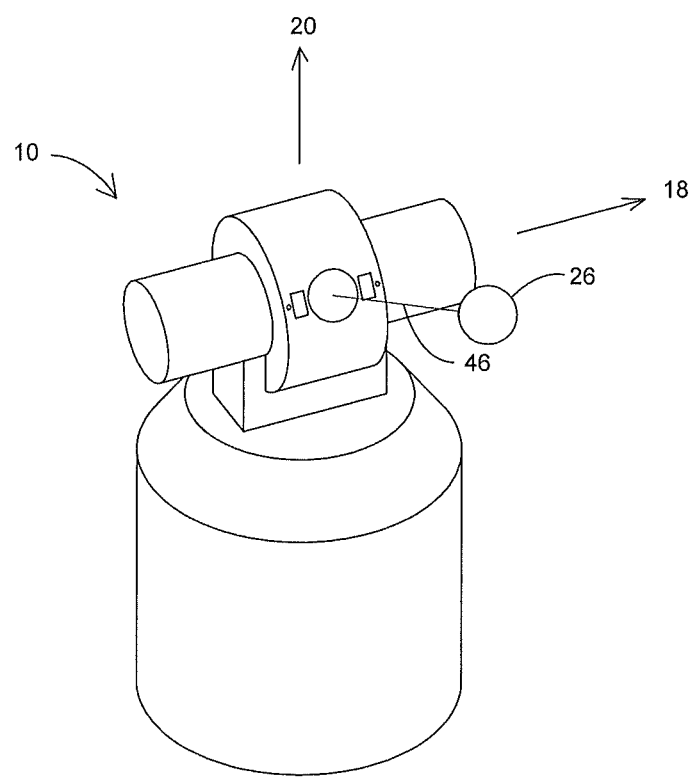
FIG. 6 is a perspective view of a laser tracker sending a light beam to a retroreflector according to an embodiment of the present invention.

A further response to the wireless signal 420 is illustrated in FIGS. 4-6. The one or more transceivers 65A, 65B, and 65C respond (step 715 in FIG. 7) by executing software that causes a repetitive sequence of events (steps 720-740 in FIG. 7) to be carried out. One or more illuminators 54 proximate to each locator camera 52 emit a cone of light (step 720 in FIG. 7), which may be modulated in time, for example, by flashing the light on and off. The cone of light may cover a relatively wide angle—for example, 60 degrees. Any retroreflector within the cone of light reflects light back to one or more cameras 52 (step 725 in FIG. 7). A lens included within each locator camera forms an image of each illuminated retroreflector onto a photosensitive array that is a part of the camera (step 730 in FIG. 7). FIG. 5 shows a nearby retroreflector 26 sending light 510 back to the locator cameras 54.

In a step 732, software determines which retroreflector meets the retroreflector criterion. For example, if the retroreflector criterion were selected by the operator to be the retroreflector target nearest the tracker beam 46, the software would evaluate the position of the images on the photosensitive array(s) of the camera(s) to determine whether the retroreflector criterion was being met. The decision of step 732 is made based on an evaluation of two conditions. First, the software notes whether the position detector is receiving a retroreflected tracker beam 46. Such a beam will be received by the position detector if the beam strikes relatively near the center of a retroreflector target. The determination of whether the position detector has received the retroreflector light is made on the basis of a signal level provided by the position detector. For example, one type of position detector is a lateral type position sensitive detector having four electrodes. By adding the voltage levels at each of the four electrodes, the total optical power present on the position detector may be determined. If the optical power exceeds a pre-established level, presence of a retroreflected portion of the beam 46 is indicated. In other words, in this case, the laser tracker has locked onto the target. Second, the software notes whether the image obtained on the photosensitive array(s) of the camera (s) 52 corresponds to the position of the retroreflector that meets the retroreflector target criterion. If this is the case and if a retroreflected portion of the tracker beam 46 is being received by the position detector, the procedure continues to track on the retroreflector target, as indicated in step 745. Otherwise, in step 740 the azimuth (AZ) and zenith (ZE) motors are activated to drive the tracker beam toward the selected retroreflector target. The steps 720-740 are then repeated until an exit condition of step 735 is satisfied.

At the step 745, tracking of the beam on the retroreflector target is initiated by activating the AZ and ZEN motors to keep the beam approximately centered on the position detector. The retroreflector may be tracked by the operator to a location of interest, at which point the tracker may be used measure distance and two angles to determine three-dimensional coordinates of an object under test (step 750 in FIG. 7).

Figure 8:
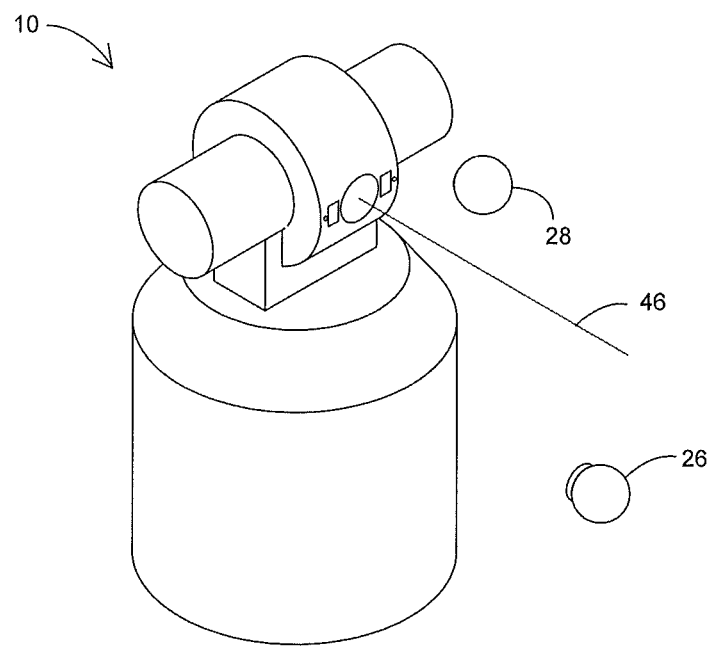
FIG. 8 is a perspective view of a laser tracker in which the beam is not locked onto any retroreflector within a field of multiple retroreflectors according to an embodiment of the present invention.
Figure 9:
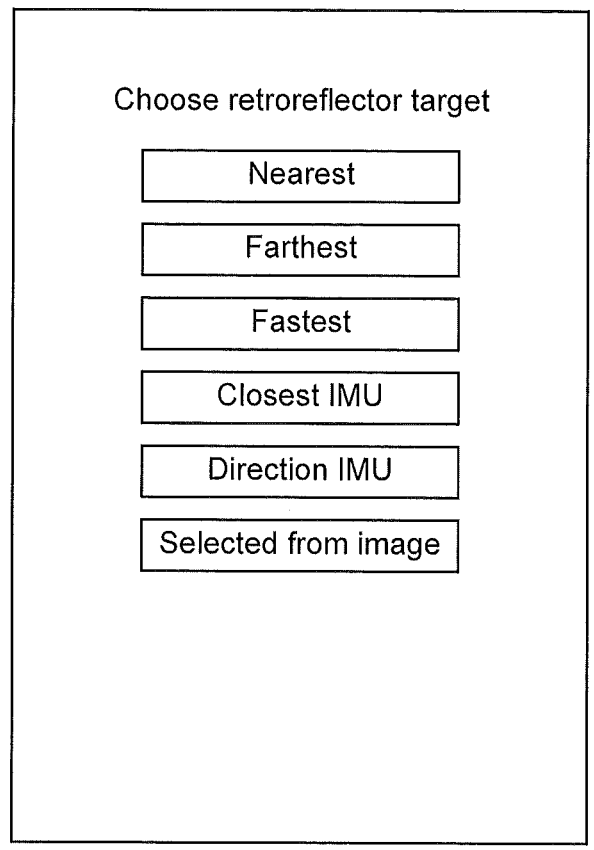
FIG. 9 is an exemplary user interface provided on a handheld appliance according to an embodiment of the present invention.

The use of the selection criterion of step 710 is illustrated for the situation shown in FIG. 8 in which two retroreflectors 26, 28 are within the cone of light emitted by the illuminators 54. In an embodiment, a target criterion is chosen by the operator, which might for example provided on IMU soft keys of a smart phone as shown in FIG. 9. In the example choices of FIG. 9, the operator may select the retroreflector target that is nearest the current beam direction, farthest from the nearest beam direction (which could be used to change the direction of the tracker by "dragging" the SMR around the outer edge of the cone of light), fastest (which could be used to select the a moving targets from among a collection of stationary targets), closest to an inertial measurement unit (IMU, which might be the IMU within a smart phone, as discussed hereinbelow), in the direction to which an IMU is pointed (as discussed hereinbelow), of selected from an image. There are many other possibilities for choices that may be offered.

In another embodiment, a mode of selection is chosen ahead of time as a setting value or default value. For example, the operator may want to always have the tracker beam lock onto the retroreflector target closest to the IMU or the operator may always want to select a retroreflector from an image. Such a setting may be chosen by the operator on a computer program used with the laser tracker, for example.

One choice the user may make is whether the method discussed herein applies only to the case in which the beam is broken (not tracking on the retroreflector) or whether it also should apply to the case in which a beam is tracking on a target and the operator wishes to direct the retroreflector to another target.

Figure 10:
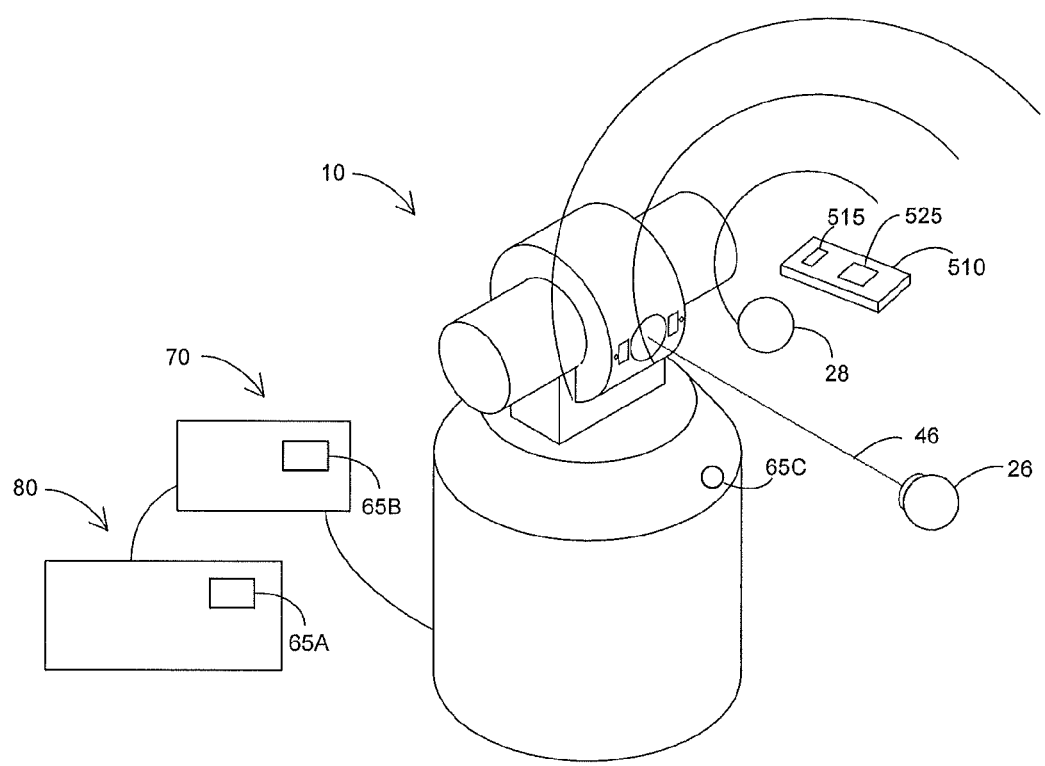
FIG. 10 is a perspective view of a laser tracker used with a wireless appliance containing a inertial measurement unit according to an embodiment of the present invention.

As an example, we consider the situation of FIG. 10 but first give some background on an inertial measurement unit (IMU) 525, which is part of the handheld appliance 510. IMUs are devices that provide information about linear or rotational motion or position as a result of inertial sensors. Examples of inertial sensors are accelerometers (which are the same thing as inclinometers), gyroscopes, magnetometers (compasses), and global positioning system (GPS) devices. It is commonplace today for smart phones to contain a three-dimensional accelerometer, a three-dimensional gyroscope, a compass, and a GPS. By establishing an initial position of an IMU in relation to a laser tracker, it is possible to get a relatively good estimate of position of the IMU over some time. For example, an initial position of an IMU in a cell phone may easily be obtained if an operator has the smart phone in a shirt pocket while a retroreflector target is being measured by the tracker. The smart phone then has the approximate three-dimensional coordinates of the measured retroreflector target. As the operator moves around, the IMU in the cell phone can provide an updated estimate of the retroreflector position.

Figure 11:
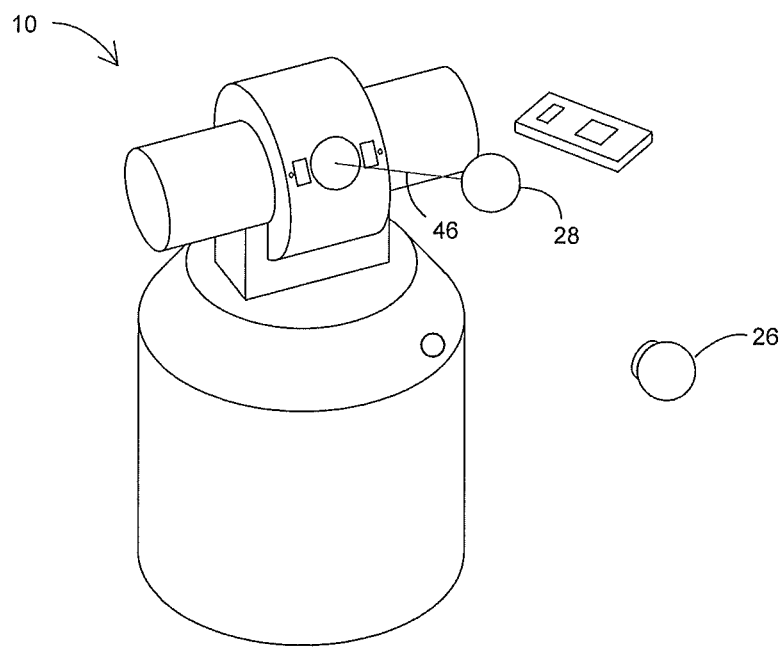
FIG. 11 is a perspective view of a laser tracker used with a wireless appliance containing a inertial measurement unit according to another embodiment of the present invention.

In FIG. 10, a beam 46 is locked onto the retroreflector 26, but the operator wants to track on a different retroreflector 28 that the operator is holding. The operator is using a handheld appliance 510 that contains an inertial measurement unit 525 and a transceiver 515. The operator chooses "Closest IMU" in the UI of FIG. 9 or by some other means (such as by making "Closest IMU" the default choice). When the operator actuates the handheld appliance to emit a wireless signal from the transceiver 515, the wireless signal received by transceivers 65A, 65B, or 65C may begin software that executes the steps of FIG. 9, driving the beam 46 to the retroreflector target 28 as shown in FIG. 11. As discussed above, for the case depicted in FIGS. 10, 11, the beam was initially locked onto one target but directed to another target by the operator.

Figure 12:
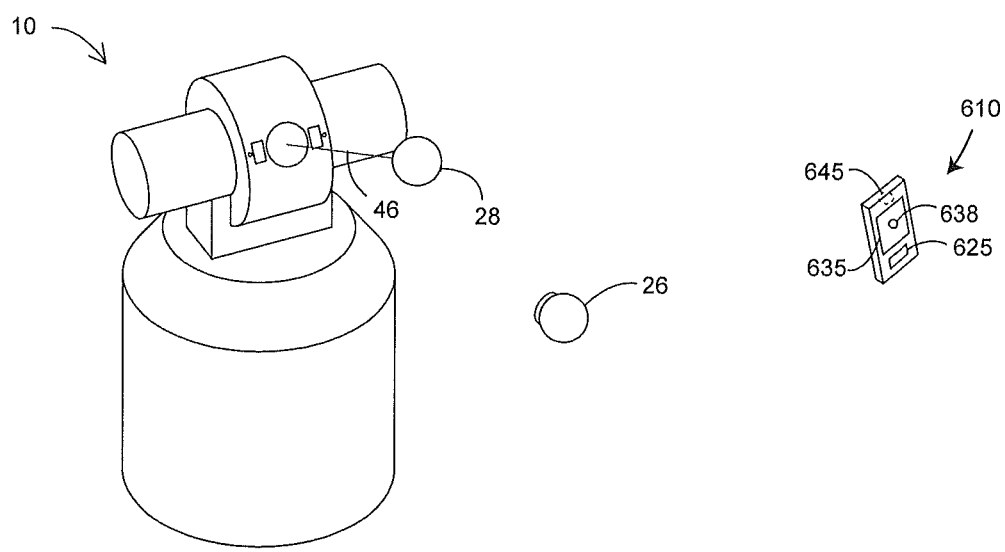
FIG. 12 is a perspective view of a laser tracker used with a wireless appliance containing an inertial measurement unit according to yet another embodiment of the present invention.

The IMUs found in smart phones and other handheld devices provide information not only about the position of the smart phone but also the direction in which the smart phone is pointing. The capability can be used to provide a useful measurement technique illustrated in FIG. 12. In the case shown in FIG. 12, the approximate position and direction of the handheld appliance 610 is known because of the IMU 625 within the appliance. By pointing the handheld appliance at the desired target 28, a rear-facing camera 645 may be used to obtain an image 638 near the center of a display screen 635. With the handheld appliance oriented in this way, a line in space may be drawn from the handheld appliance 610 to each of the cameras 52. This line may be projected mathematically on each of the photosensitive arrays of the cameras 52 and software used to determine those retroreflector targets closest to the projected line.

Another possibility is to have the cameras 52 send an image showing the relative positions of the retroreflector targets from the perspective of the laser tracker. The operator may then select the retroreflector target of interest.

The handheld appliances described hereinabove may be any of several different types. They might be remote controls, mobile phones (including smart phones), electronics pads, or keypads. Although wireless communication is advantageous in most cases, it is also possible to use the method described herein with a wired method—in other words, with the handheld appliance communication with the laser tracker or associated computer through a wired connection.

While preferred embodiments have been shown and described, various modifications and substitutions may be made thereto without departing from the spirit and scope of the invention being indicated by the appended claims.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for locking onto and tracking a selected retroreflector target with a laser tracker, the locking onto and tracking carried out under direction of an operator, the method including steps of:
   providing at least one retroreflector target;
   providing the laser tracker, the laser tracker having a structure, a first light source, a distance meter, a first angular transducer, a second angular transducer, a position detector, a camera, a second light source, and a processor, the structure rotatable about a first axis and a second axis; the first light source configured to produce a first light beam that cooperates with the distance meter, the first angular transducer configured to measure a first angle of rotation about the first axis, the second angular transducer configured to measure a second angle of rotation about the second axis, the position detector configured to receive a reflected beam, the reflected beam being the first light beam reflected by a retroreflector target, the camera including a lens system and a photosensitive array, the second light source configured to provide a cone of light, the first light beam and the cone of light being fixed in relation to the structure, the second light source configured to cooperate with the camera, the camera having a field of view, the processor configured to operate the laser tracker;

providing a tracker transceiver coupled to the laser tracker or coupled to a computer in communication with the laser tracker, the tracker transceiver including a receiver and optionally a transmitter;

providing a handheld appliance having an appliance transceiver affixed to the handheld appliance, the appliance transceiver configured to wirelessly communicate with the tracker transceiver, the appliance transceiver configured to emit a wireless signal selected from the group consisting of an RF signal, a microwave signal, and an infrared signal;

positioning the at least one retroreflector target within the field of view of the camera;

actuating by the operator the handheld appliance and in response to the actuation sending a first wireless signal from the appliance transceiver to the tracker transceiver;

in response to reception of the first wireless signal by the tracker receiver, determining a retroreflector target criterion;

responding to the first wireless signal by repetitively carrying out steps in a loop including the following steps (a)-(e) and exiting the loop when an exit condition is met:

(a) reflecting part of the cone of light by the at least one retroreflector target and capturing an array image on the photosensitive array;

(b) determining which of the at least one retroreflector target meets the retroreflector target criterion, the determining based at least in part on the array image, the retroreflector target that meets the retroreflector target criterion referred to as the selected retroreflector target;

(c) measuring a signal level with the position detector and determining, based on the signal level, whether the position detector is receiving the reflected beam;

(d) establishing whether the exit condition is met, the exit condition being met if and only if the position detector receives the reflected beam and the reflected beam comes from the selected retroreflector target;

(e) activating the first motor and the second motor to steer the first light beam toward the selected retroreflector target;

activating the first motor and the second motor to steer the reflected beam so as to keep the reflected beam on the position detector; and measuring to the selected retroreflector target a distance with the distance meter, a third angle with the first angular transducer, and a fourth angle with the second angular transducer.

2. The method of claim 1, wherein, in the step of providing a handheld appliance, the handheld appliance is a handheld phone.

3. The method of claim 1, wherein, in the step of providing a handheld appliance, the handheld appliance is a remote control.

4. The method of claim 1, wherein the step of determining a retroreflector target criterion further includes choosing by the operator a retroreflector target criterion with the handheld appliance.

5. The method of claim 1, wherein the step of determining a retroreflector target criterion further includes providing and using a default retroreflector target criterion.

6. The method of claim 4, wherein the criterion is selected from the group consisting of: the retroreflector target having an image nearest a center of the photosensitive array, the retroreflector target having an image nearest an edge of the photosensitive array, the retroreflector target having an image having the greatest speed from among the retroreflector target images as determined from successive array images, the retroreflector target image corresponding to the retroreflector target located nearer an inertial measurement unit than any other retroreflector target in the field of view of the camera, the retroreflector target having an image corresponding to the retroreflector target located nearer than any other retroreflector target to a line originating at the inertial measurement unit and projecting toward the retroreflector target, and the retroreflector target selected by the operator from among retroreflector targets represented by images in the array image sent from the transceiver to the handheld appliance.

7. The method of claim 1, wherein the step of providing a handheld appliance further includes steps of:

providing an inertial measurement unit affixed to the handheld appliance, the inertial measurement unit configured to measure inertial quantities, the inertial measurement unit in communication with the appliance transceiver;

placing the inertial measurement unit in the proximity of a second retroreflector target;

measuring with the laser tracker a first position of the second retroreflector;

measuring initial inertial quantities with the inertial measurement unit;

wirelessly transmitting initial inertial quantities from the appliance transceiver to the tracker transceiver; and setting an initial position of the inertial measurement unit to the first position of the second retroreflector.

8. The method of claim 7, wherein, in the step of providing a handheld appliance, the inertial measurement unit includes a three-dimensional accelerometer and a three-dimensional gyroscope, the three-dimensional accelerometer configured to measure acceleration in three dimensions and the three-dimensional gyroscope configured to measure changes in angular orientation about three axes.

9. The method of claim 7, wherein the step of actuating by the operator the handheld appliance further includes steps of:

placing the inertial measurement unit in proximity of a third retroreflector target;

measuring second inertial quantities with the inertial measurement unit;

wirelessly transmitting second inertial quantities from the appliance transceiver unit to the tracker transceiver;

obtaining an approximate position of the third retroreflector target based at least in part on the second inertial quantities received by the tracker transceiver; and determining that the third retroreflector target is the selected retroreflector target, the determining based at least in part on the approximate position of the inertial measurement unit.

10. The method of claim 7, wherein the step of actuating by the operator the handheld appliance further includes steps of:
aiming by the operator the handheld appliance in the direction of a third retroreflector target;
measuring second inertial quantities with the inertial measurement unit;
wirelessly transmitting second inertial quantities from the appliance transceiver to the tracker transceiver;
obtaining an approximate line on which the third retroreflector target lies, the approximate line based at least in part on the second inertial quantities received by the tracker transceiver; and
determining that the third retroreflector target is the selected retroreflector target, the determining based at least in part on a line on which the third retroreflector target lies.

* * * * *